US009649965B1

(12) United States Patent
Burkhardt

(10) Patent No.: US 9,649,965 B1
(45) Date of Patent: May 16, 2017

(54) TRUCK BED ASSIST HANDLE AND METHOD THEREFOR

(71) Applicant: George Wayne Burkhardt, San Antonio, TX (US)

(72) Inventor: George Wayne Burkhardt, San Antonio, TX (US)

( * ) Notice: Subject to any disclaimer, the term of this patent is extended or adjusted under 35 U.S.C. 154(b) by 29 days.

(21) Appl. No.: 14/788,545

(22) Filed: Jun. 30, 2015

(51) Int. Cl.
*B60N 3/02* (2006.01)

(52) U.S. Cl.
CPC ............ *B60N 3/023* (2013.01); *B60N 3/026* (2013.01)

(58) Field of Classification Search
CPC ........... B60N 3/02; B60N 3/023; B60N 3/026
USPC .................................. 296/1.02; 16/429, 422
See application file for complete search history.

(56) References Cited

U.S. PATENT DOCUMENTS

| 3,858,905 | A | 1/1975 | Peebles | |
|---|---|---|---|---|
| 5,028,063 | A | 7/1991 | Andrews | |
| 6,340,189 | B1 * | 1/2002 | Pordy | B60N 3/023 296/1.02 |
| 6,799,353 | B1 * | 10/2004 | Stewart | B60N 3/023 296/1.02 |
| 7,090,276 | B1 * | 8/2006 | Bruford | B62D 33/0273 296/1.02 |
| 8,251,423 | B1 * | 8/2012 | Lingle | B60R 3/00 296/1.02 |
| 8,360,455 | B2 | 1/2013 | Leitner | |
| 8,393,657 | B1 * | 3/2013 | Duderstadt | B60R 3/00 293/117 |
| 8,613,475 | B1 * | 12/2013 | Statz | B60R 3/007 296/1.02 |
| 8,678,457 | B1 * | 3/2014 | Duderstadt | B60R 3/00 296/1.02 |

* cited by examiner

*Primary Examiner* — Jason S Morrow

(57) ABSTRACT

In accordance with the present invention, a novel, simple, inexpensive, user friendly and portable, truck bed assist handle quickly attachable without tools to a truck tailgate striker and tailgate hinge is presented. The assist handle provides for easy access into a truck bed. The handle includes an elongated body having a first end portion and a second end portion. The first end portion being a tailgate hinge connector configured for removably engaging with the tailgate hinge. The second end portion being a hand grip. Positioned thereinbetween the first end portion and the second end portion, the body has one of at least one first tailgate striker connector integrated therewithin the body and a structure attached thereon the body. The structure has at least one second tailgate striker connector integrated thereon. Both at least one tailgate striker connectors being configured for removably engaging with the tailgate striker.

20 Claims, 13 Drawing Sheets

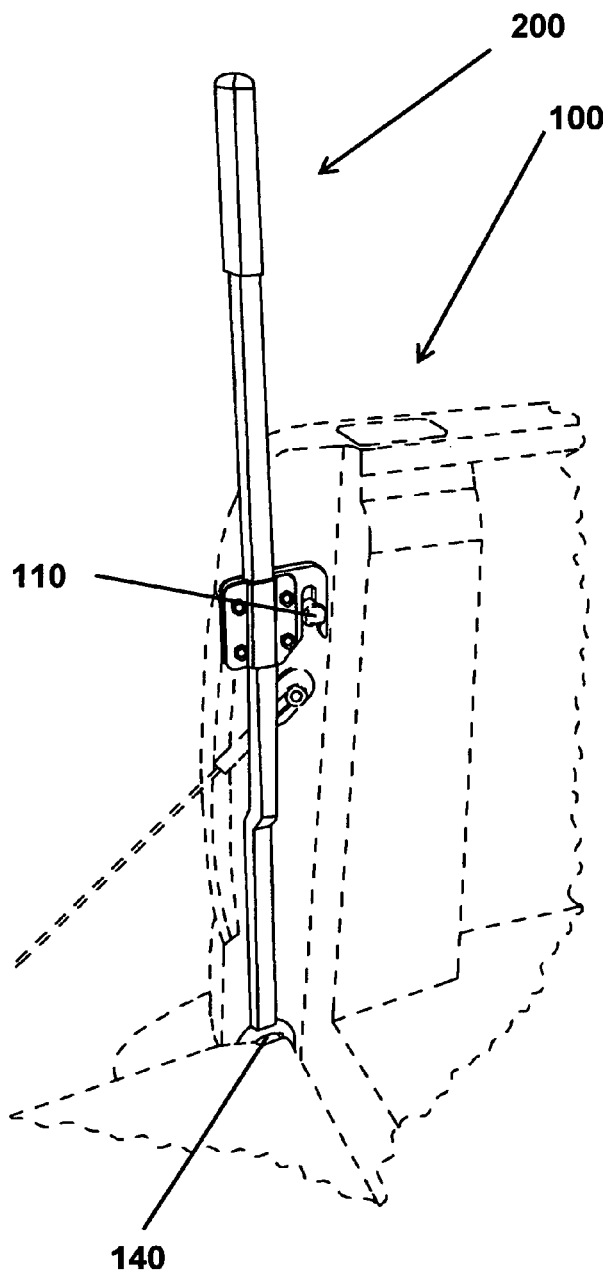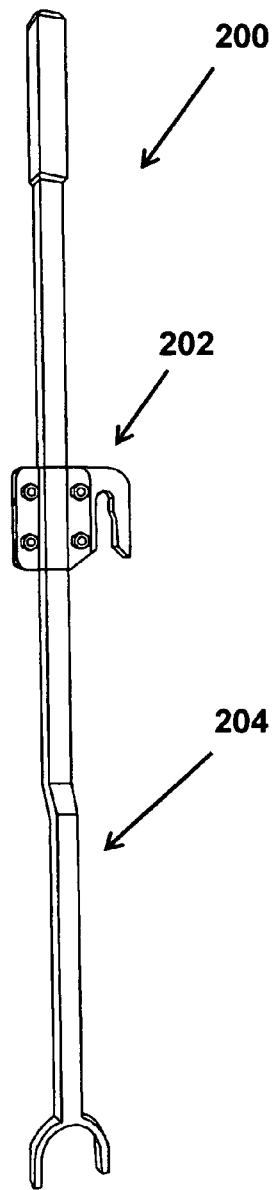
FIG. 3  FIG. 4

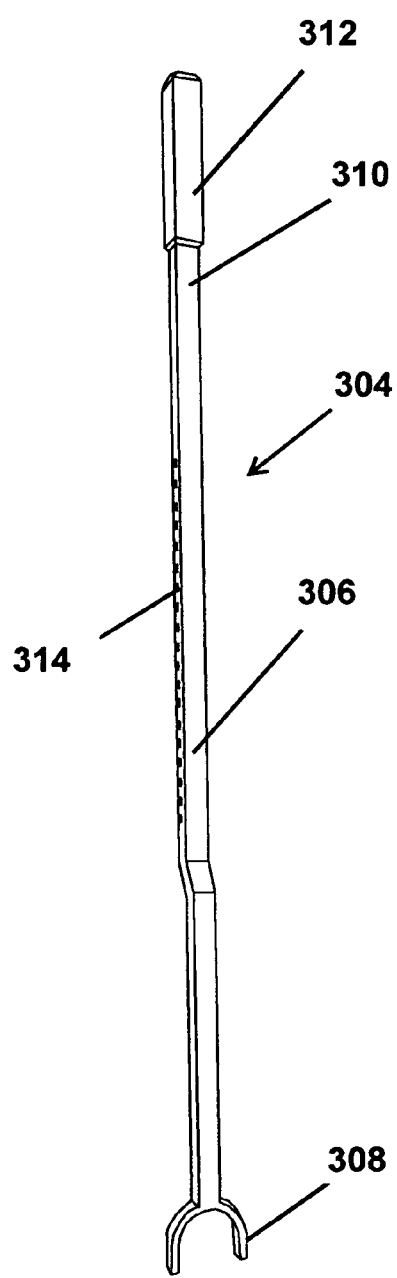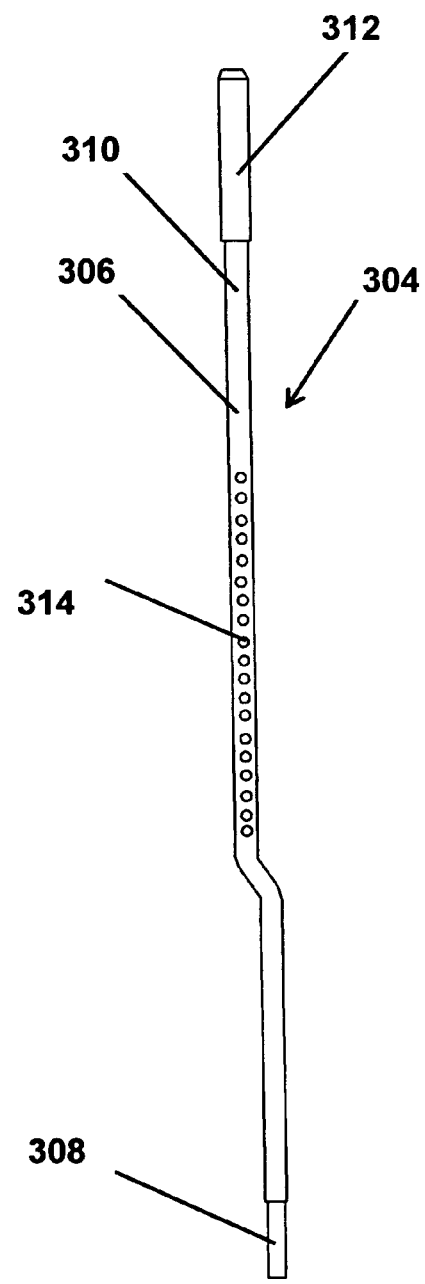
FIG. 11  FIG. 12

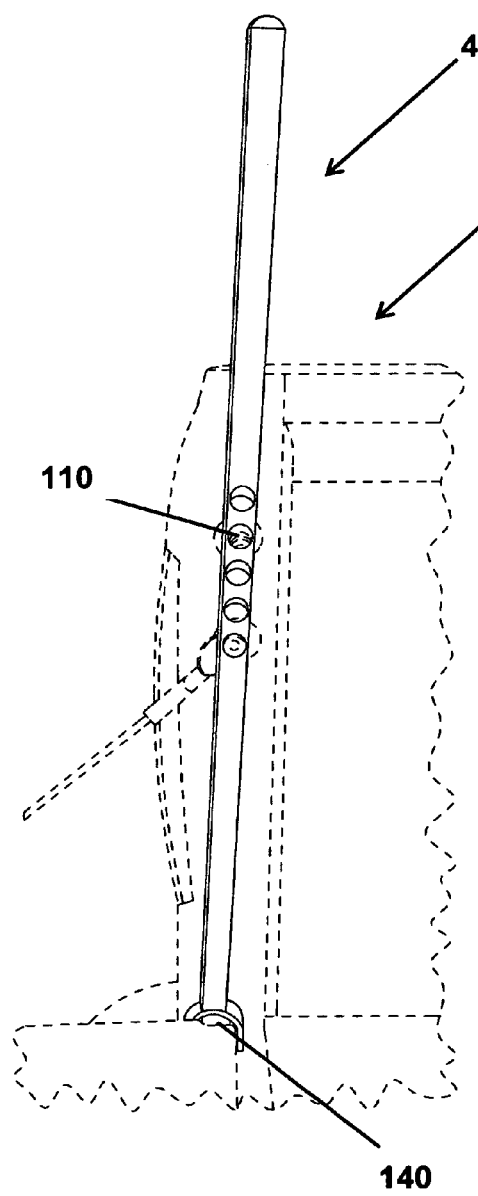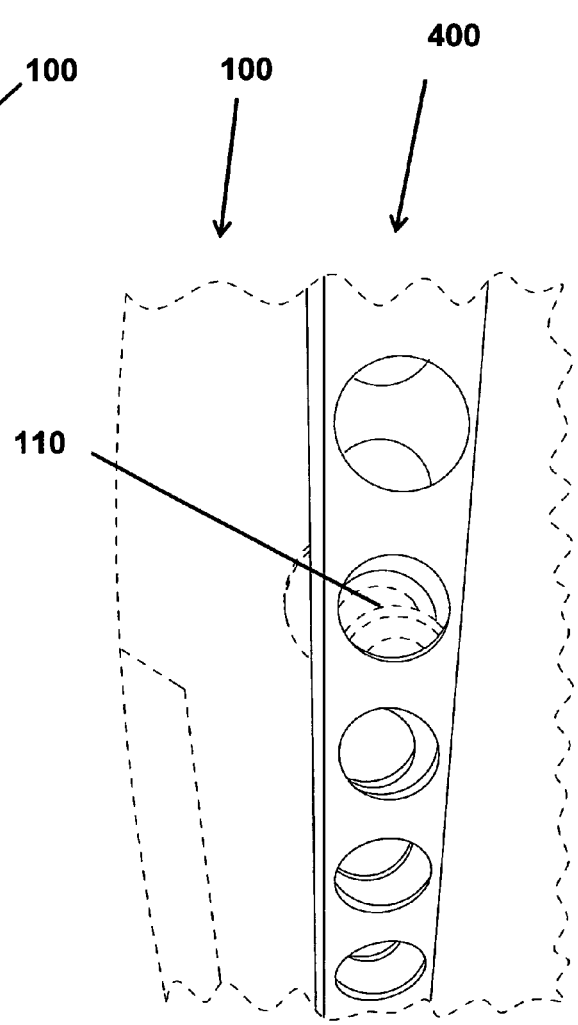
FIG. 14  FIG. 15

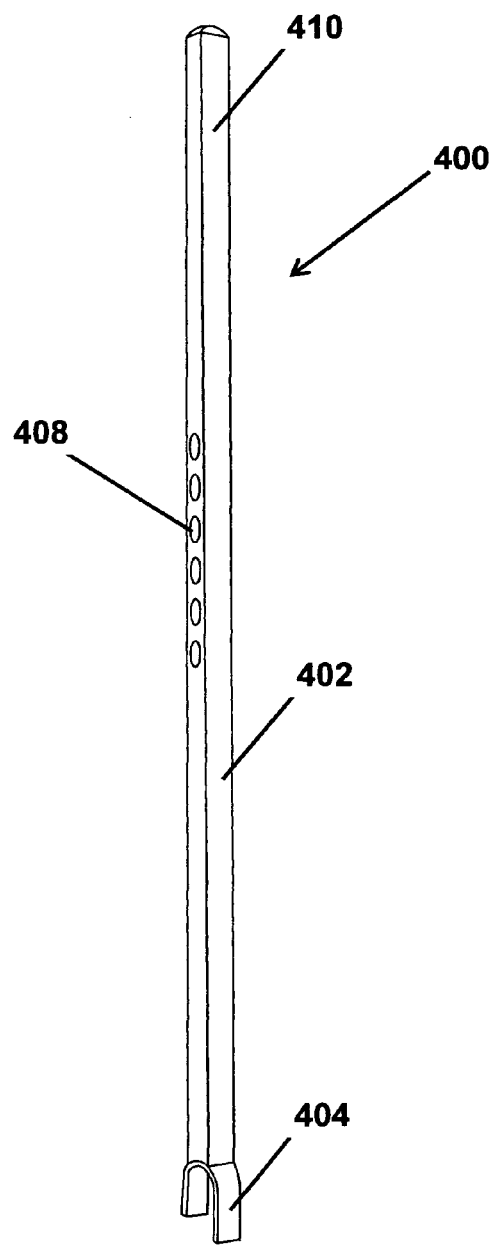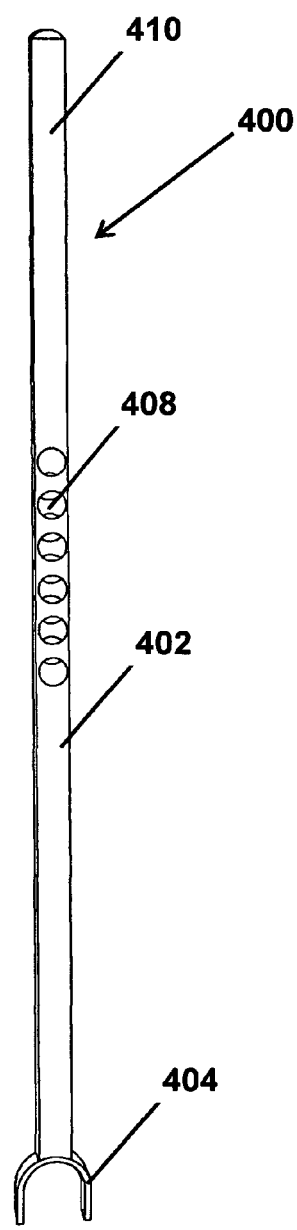
FIG. 16          FIG. 17

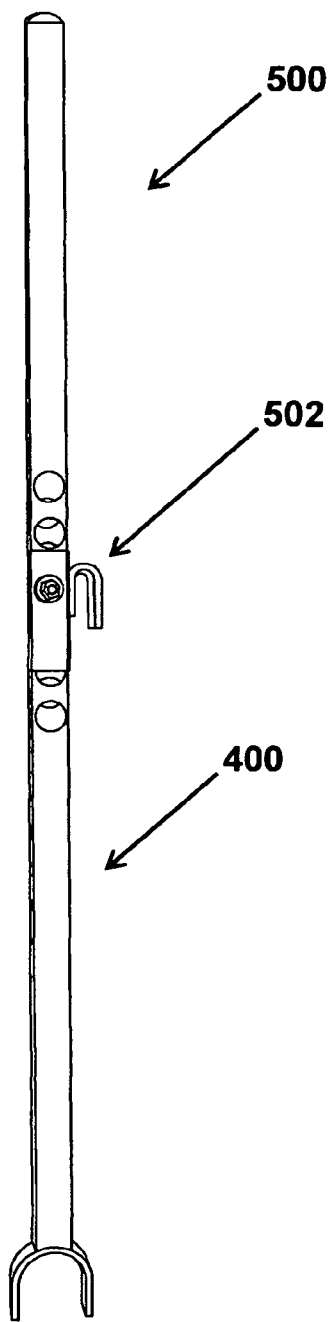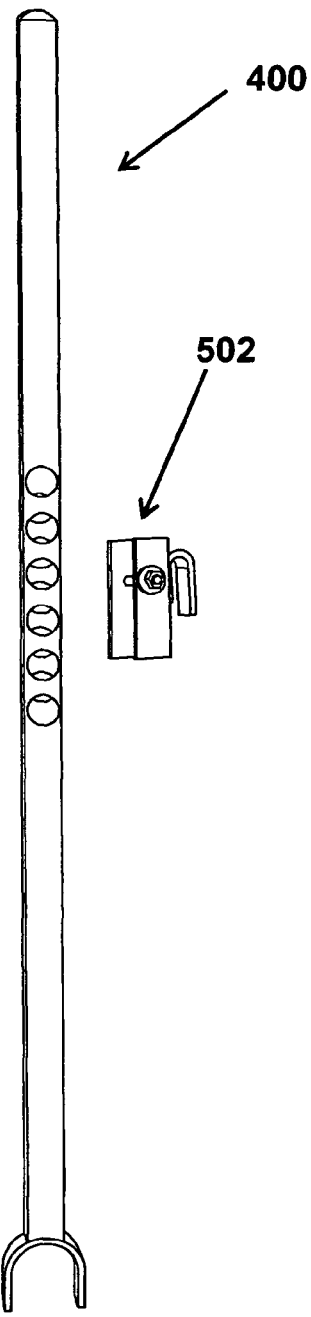
FIG. 18  FIG. 19

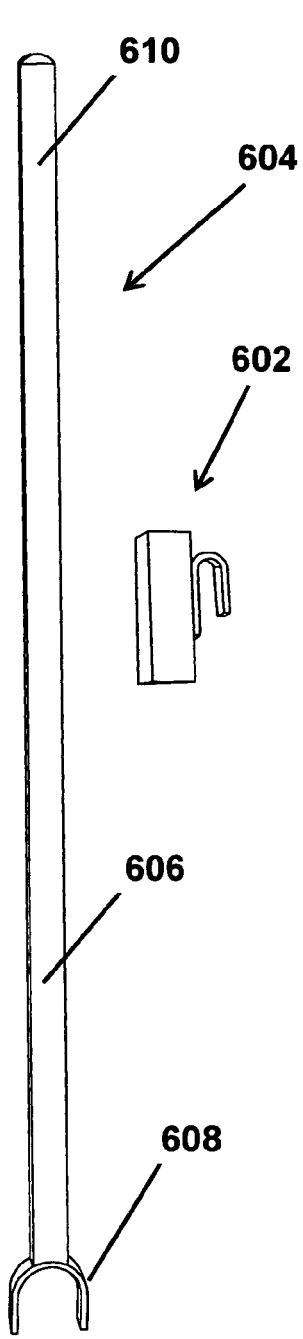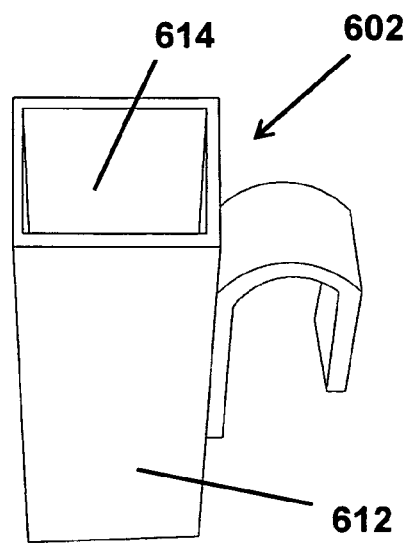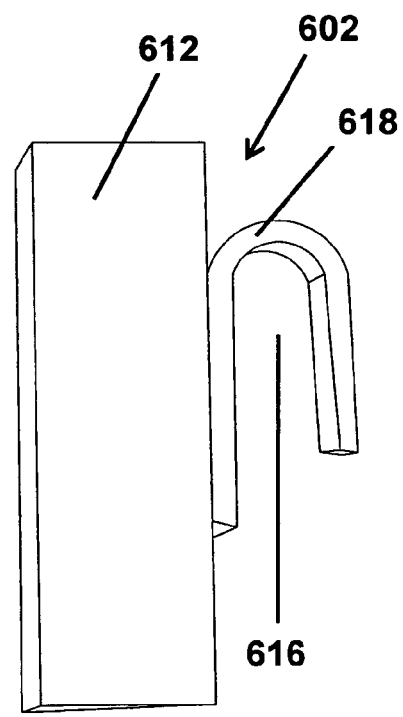
FIG. 23
FIG. 24
FIG. 25

TRUCK BED ASSIST HANDLE AND METHOD THEREFOR

CROSS-REFERENCE TO RELATED APPLICATIONS

This application claims the benefit of Provisional U.S. Patent Application Ser. No. 61/998,587. filed Jul. 2, 2014 by the present inventor.

FEDERALLY SPONSORED RESEARCH

None.

SEQUENCE LISTING

None.

BACKGROUND OF THE INVENTION—FIELD OF INVENTION

This invention relates to a truck bed assist handle and control method therefor that provides for easy entrance to a truck bed with its tailgate down and more specifically, to a simple assist handle that quickly attaches to truck tailgate related components and provides an upwardly extending handle to assist a user in easy entry to the truck bed cargo area.

BACKGROUND OF THE INVENTION—PRIOR ART

Frequently, pickup truck users have to enter the truck bed with the tailgate in the down position to load, remove and access cargo. Compared to trucks of the past, pickup truck bed to ground height distance has significantly increased which has made bed entrance increasingly more difficult. Increased bed to ground height distance of larger pickup trucks, especially four wheel drive trucks, have further compounded the bed entrance problem. To enter the bed, some people sit on the tailgate and rollover in the bed and then stand up while others use a ground based step to assist in bed entrance. Some of the more physically fit and taller people step on the corner of the bumper and inconveniently, grab the bed side wall lifting their body essentially with one leg, all done oriented in an awkward lifting position. Since the bed side wall is difficult to grip, the arm(s) provide only stability and essentially negligible lifting assistance.

To counter this bed entrance problem, some truck manufacturers have recently integrated steps in their truck bumpers and tailgates. In the case of bumper steps, the ground height of the step is still relatively high and one leg has to accomplish complete body lifting since the arm(s) essentially only provide for stability. With respect to tailgate steps integrated into trucks during manufacture, the truck purchase cost is significantly higher and the process of step setup and return after use is time consuming. Truck aftermarket suppliers have introduced somewhat costly add-on steps and ladders that require permanent attachment to the truck. Still others have invented bed assist handles but require permanent attachment to the bed interior sidewall via drilled holes in the sidewall which is unacceptable to most truck owners.

In an attempt to overcome these truck bed entrance problems, a number of prior art devices have been patented but they all heretofore known suffer from a number of deficiencies and drawbacks. Examples of these prior art patents are cited in the following paragraphs.

U.S. Pat. No. 3,858,905 issued Jan. 7, 1975 to Delbert W. Peebles presents a demountable safety ladder with hand rail. While this ladder provides easier entrance to a truck bed, it has a number of disadvantages, namely (1) it is complicated and expensive, (2) requires permanent mounting to the truck tailgate and (3) is not easily storable.

U.S. Pat. No. 5,028,063 issued July 1991 to Dean D. Andrews presents a folding step system. While this folding step system provides easier entrance to a truck bed, it has a number of disadvantages, namely (1) it is complicated and expensive, (2) requires permanent mounting to the truck tailgate and (3) is not easily storable.

U.S. Pat. No. 7,090,276 issued Aug. 15, 2006 to Steve Bruford, Larry Holt, Charles Bambenek and Jeff Firzlaff presents a grab handle for use with a supplemental tailgate on pick-up trucks. While this grab handle provides easier entrance to a truck bed, it has a number of disadvantages, namely (1) it is complicated and expensive, (2) requires integration into the truck tailgate during truck manufacture and (3) handle and step setup and return to storage after use is time consuming.

U.S. Pat. No. 8,251,423 issues Aug. 28, 2012 to James R. Lingle presents a truck bed handle assembly. While this handle assembly provides easier entrance to a truck bed, it has a number of disadvantages, namely (1) it is somewhat involved, and (2) requires permanent attachment to the truck.

U.S. Pat. No. 8,678,457 issued Mar. 25, 2014 to James Louis Duderstadt presents a telescoping grab handle for pickup trucks and the like. While this grab handle provides easier entrance to a truck bed, it has one main disadvantage, namely it requires permanent attachment to the truck via drilled holes in the bed sidewall.

U.S. Pat. No. 8,360,455 issued Jan. 29, 2013 to Horst Leitner and Anthony Smith presents a tailgate access step. While this tailgate access step provides easier entrance to a truck bed, it has a number of disadvantages, namely (1) it is somewhat complicated and expensive, (2) requires permanent attachment to the truck and (3) the user has to inconveniently grab the truck bed sidewall for stability.

While these truck bed entrance devices provide for relative easy entrance to pickup truck beds, they all heretofore known suffer from deficiencies and drawbacks. Thus, there remains a need in the art for an inexpensive, simple-to-use, user friendly, and reliable truck bed assist handle which provides for easy entrance into a pickup truck bed which offers the following advantages and capabilities: (1) is easily attached and removed from the truck with no tools and therefore, does not require permanent mounting, (2) is portable, (3) provides for using both of the user's arms to assist in lifting the user's body into the truck bed, (4) a single assist handle that fits all recent pickup trucks.

SUMMARY

In accordance with the present invention, a novel, simple, inexpensive, user friendly and portable, truck bed assist handle quickly attachable without tools to a truck tailgate striker and tailgate hinge is presented. The assist handle provides for easy access into a truck bed. The handle includes an elongated body having a first end portion and a second end portion. The first end portion being a tailgate hinge connector configured for removably engaging with the tailgate hinge. The second end portion being a hand grip. Positioned thereinbetween the first end portion and the second end portion, the body has one of at least one first tailgate striker connector integrated therewithin the body and a structure attached thereon the body. The structure has at least one second tailgate striker connector integrated thereon. Both at least one tailgate striker connectors being configured for removably engaging with the tailgate striker.

Whereby, a truck user can attach the assist handle to the truck's tailgate striker and tailgate hinge, with the tailgate in the down position, and then by using said second end portion for lifting and stability assistance, the user can easily access the truck's bed.

One of the embodiments disclosed herein includes a method for providing easy entrance into a bed of a truck having a tailgate hinge and a tailgate striker.

Accordingly, the present invention may have one or more of the following advantages which are:

(a) to provide a truck bed assist handle for quick and easy entrance to a truck bed with the tailgate in the down position;
(b) to provide a truck bed assist handle that is portable;
(c) to provide a truck bed assist handle that does not require tools for attachment to or removal from the truck bed;
(d) to provide a single truck bed assist handle that fits all recent models of standard pickup trucks;
(e) to provide a truck bed assist handle in which both arms can assist the leg in lifting the user's body into the bed;
(f) to provide a truck bed assist handle that is simple in design and inexpensive; and
(g) to provide a truck bed assist handle that is reliable.

DRAWINGS

A better understanding of the present invention may be had by reference to the drawing figures wherein:

FIG. 3 is a side perspective view showing a first embodiment of the truck bed assist handle connected to a Fork pickup truck.

FIG. 4 is a side perspective view showing the first embodiment of the truck bed assist handle.

FIG. 11 is a side perspective view showing the body of the second embodiment of the truck bed assist handle.

FIG. 12 is a side perspective view showing the body of the second embodiment of the truck bed assist handle oriented at a different viewpoint from that shown in FIG. 11.

FIG. 14 is a side perspective view showing the third embodiment of the truck bed assist handle attached to a Ford pickup truck.

FIG. 15 is a close-up side perspective view showing the third embodiment of the truck bed assist handle attached to the tailgate striker of a Ford pickup truck.

FIG. 16 is a side perspective view showing the body of the third embodiment of the truck bed assist handle.

FIG. 17 is a side perspective view showing the body of the third embodiment of the truck bed assist handle oriented at a different viewpoint from that shown in FIG. 16.

FIG. 18 is a side perspective view of the fourth embodiment showing a connector assembly adapter installed on the truck bed assist handle of the third embodiment.

FIG. 19 is a side perspective view of the fourth embodiment showing the connector assembly adapter removed from the truck bed assist handle of the third embodiment.

FIG. 23 is a side perspective view showing the body and connector assembly of the fourth embodiment of the truck bed assist handle.

FIG. 24 is a close-up side perspective view showing the connector assembly of the fourth embodiment of the truck bed assist handle.

FIG. 25 is a close-up side view showing the connector assembly of the fourth embodiment of the truck bed assist handle.

DETAILED DESCRIPTION OF THE EMBODIMENTS

First Embodiment—FIG. 1 Through FIG. 8

Figures 1, 2:
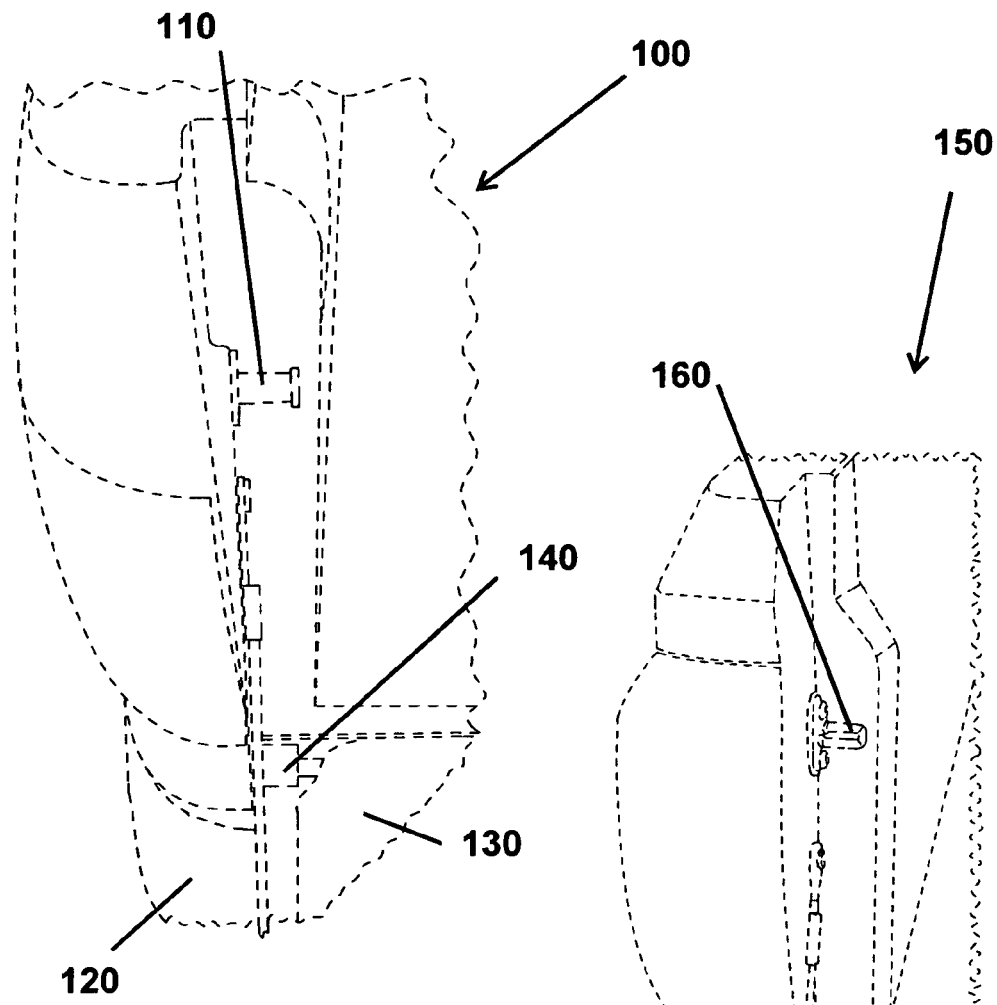
FIG. 1 is an end perspective view showing a Ford pickup truck with its tailgate in the down position.
FIG. 2 is an end perspective view showing a Toyota pickup truck with its tailgate in the down position.

Referring to FIG. 1, an end perspective view of a Ford pickup truck bed 100 with its tailgate 130 in the down position is shown. The bed's left tailgate striker 110, the left bumper corner 120 and the left tailgate hinge 140 are shown for reference. Referring to FIG. 2, an end perspective view of a Toyota pickup truck bed 150 with its tailgate 190 in the down position is shown. The left tailgate striker 160, the left bumper corner 180 and the left tailgate hinge 170 are shown for reference. The Ford truck bed 100 is shown because its tailgate striker 110 represents tailgate strikers on Dodge, Nissan, GMC and Chevrolet pickup trucks. The tailgate striker 160 on the Toyota pickup truck bed 150 is unique. The tailgate striker 110 is of a post configuration while the tailgate striker 160 is of a square "U" or loop configuration. Note that the terminology, "tailgate striker", is the common term used in the truck industry to denote the part on the sidewall of a truck's bed used to latch the tailgate.

FIG. 3 shows a side perspective view of a first embodiment of the truck bed assist handle attached to the Fork pickup truck bed 100. The truck bed assist handle 200 of the first embodiment is shown attached to the tailgate striker 110 and the tailgate hinge 140 but would also attach to the aft portion of the tailgate striker 160 and to the tailgate hinge 170 of the Toyota pickup truck bed 150 in the same manner.

FIG. 4 shows a side perspective view the truck bed assist handle 200. The handle 200 includes a tailgate striker connector assembly 202 and an elongated body 204.

Figure 5:
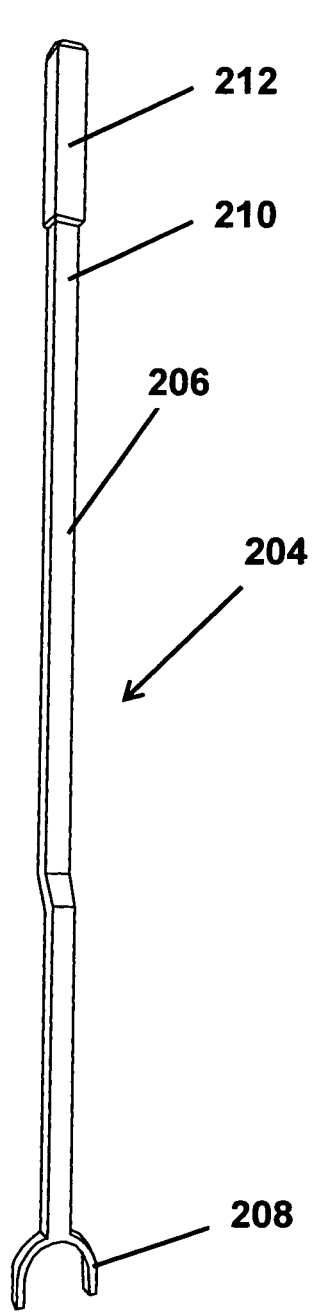
FIG. 5 is a side perspective view showing the body of the first embodiment of the truck bed assist handle.
Figure 6:
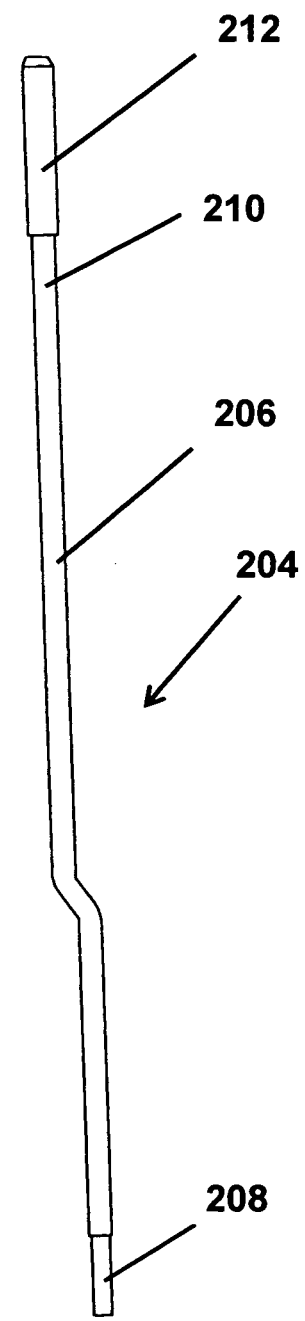
FIG. 6 is a side perspective view showing the body of the first embodiment of the truck bed assist handle orientated at a different viewpoint from that in FIG. 5.

FIG. 5 shows a perspective view of one side of the body 204 while FIG. 6 shows a perspective view of an adjacent side of the body 204. The body 204 includes a hollow or solid shaft 206, a tailgate hinge connector 208 positioned at its lower end and a hand grip section or portion 210 at its upper end. A hand grip cushion 212 covers at least a portion of the hand grip section 210.

Figure 7:
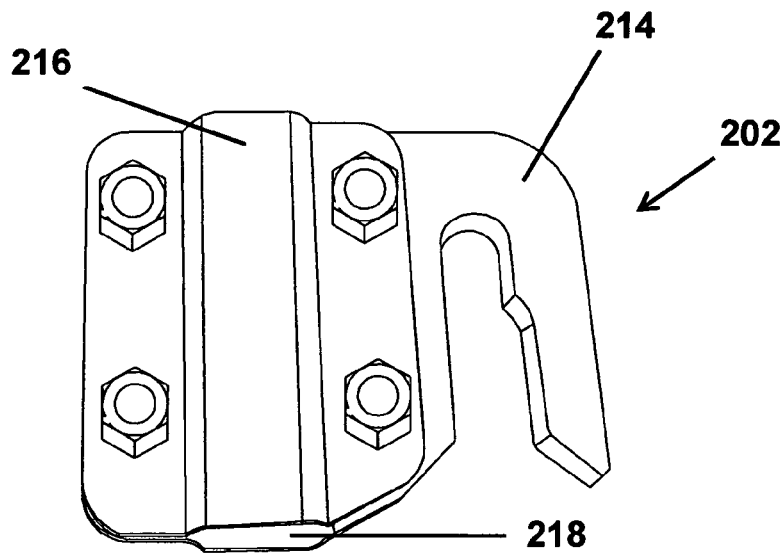
FIG. 7 is a side perspective view showing a connector assembly of the first embodiment of the truck bed assist handle.
Figure 8:
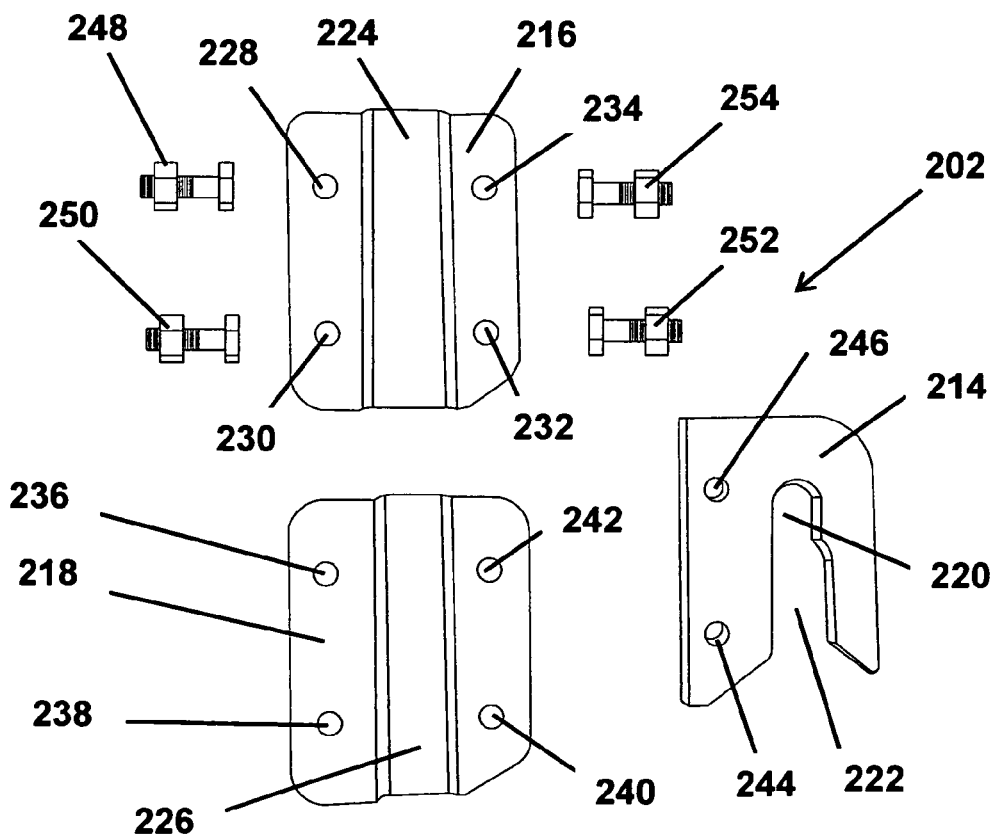
FIG. 8 is a side perspective view showing the disassembled components of the connector assembly of the first embodiment of the truck bed assist handle.

FIG. 7 shows a side perspective view of the connector assembly 202 while FIG. 8 shows a side perspective view of the connector assembly 202 disassembled. The connector assembly 202 includes a tailgate striker connector 214 with attach holes 244 and 246; a right side plate 216 with attach holes 228, 230, 232 and 234; a left side plate 218 with attach holes 236, 238, 240 and 242; and attach bolt/washer/nut combinations 248, 250, 252 and 254. The right side plate 216 has an inward recessed area 224 and the left side plate 218 has a corresponding inward recessed area 226 to accommodate the body 204 when the connector assembly 202 is assembled. The connector 214 has slots 220 and 222 of different sizes to accommodate the varying sizes of tailgate strikers on various trucks. The slots 220 and 222 form the general shape of a hook in connector 214.

Assembly of the connector assembly 202 is described as follows. The bolts and corresponding washers of the attach bolt/washer/nut combinations 248, 250, 252 and 254 are inserted in respective holes 236, 238, 240 and 242. The appropriate area of the shaft 206 is placed in the recessed area 226 of the left side plate 218 such that the shaft 206 to connector assembly 202 is orientated as required depending on which side of the truck bed will be used for bed entrance. The bolts associated with holes 240 and 242 are inserted into the holes 244 and 246 of the connector 214. The right side plate 216 is then positioned so that the bolts and corresponding washers of the attach bolt/washer/nut combinations 248, 250, 252 and 254 are inserted in respective holes 228, 230, 232 and 234 and the recessed area 224 is aligned with the shaft 206. The nuts and corresponding washers of the attach bolt/washer/nut assemblies 248, 250, 252 and 254 are attached to their respective bolt and hand tightened.

Note that FIG. 3-7 show the tailgate hinge connector 208 having an inverted "U" shape for a portion of the "U" to be positioned both forward and aft of the tailgate hinges 140 and 170. As an alternative, the connector 208 does not have to be a complete "U" but can be configured to have a portion positioned either forward or aft of the tailgate hinges 140 and 170, but not both. Additionally, the forward and/or aft sides of the end portion of the body 204 can be cut out to accommodate the aft sides of the tailgate hinges 140 and 170. Likewise, FIGS. 3 and 7 show a portion of the tailgate striker connector 214 of connector assembly 202 positioned both forward and aft of the tailgate striker 110. As an alternative, the connector 214 can be designed to have a portion positioned either forward or aft of the tailgate striker 110 but not both. What is important is that the tailgate hinge connector 208 removably secures the lower part of the assist handle 200 to the tailgate hinges 140 and 170 and the tailgate striker connector 214 removably secures the upper portion of the assist handle 200 to the tailgate strikers 110 and 160. In addition, the tailgate hinge connector 208 can be configured to articulate with articulation being controlled by a hand control located adjacent to the hand grip section 210 for easy grabbing and subsequent retrieval of objects from the truck bed.

Operation of the First Embodiment—FIG. 1 Through FIG. 4

Before operating the first embodiment, the truck bed assist handle 200 has to be adjusted to fit the appropriate truck. With the tailgate 130 or 190 in the down position, the truck bed assist handle 200 is installed on the side of truck bed relative to how the tailgate striker connector assembly 202 was orientated on the body 204, as mentioned in the preceding paragraph. The truck bed assist handle 200 is first positioned so that the tailgate hinge connector 208 is engaged with the tailgate hinge 140 or 170, as applicable. The tailgate striker connector assembly 202 is moved along the body 204 until the appropriate slots 220 or 222 of the tailgate striker connector 214 are engaged with the truck tailgate striker 110 or 160, as appropriate. The nuts applicable to the bolt/washer/nut combinations 248, 250, 252 and 254 are then fully tightened to secure the connector assembly 202 to the body 204. The truck bed assist handle 200 is now adjusted to the truck bed 100 or 150, as appropriate, and the truck bed 100 or 150 side of use.

To enter the truck bed, the user first positions the tailgate 130 or 190 in the down position and then installs the truck bed assist handle 200 to the predetermined side of the bed so that the tailgate hinge connector 208 is engaged with the tailgate hinge 140 or 170, as appropriate and the tailgate striker connector slot 220 or 222, as appropriate, is engaged with the tailgate striker 110 or 160, as appropriate. Refer to FIG. 3 for reference. The user then grabs the hand grip cushion 212 and/or the hand grip section 210, as appropriate, with either one hand or both hands and places his/her appropriate foot on the bumper corner 120 or 180, or other truck structure, as appropriate, and uses both his/her leg and arm(s) to easily lift his/her body into the truck bed.

Second Embodiment—FIG. 9 Through FIG. 13

Figures 9, 10:
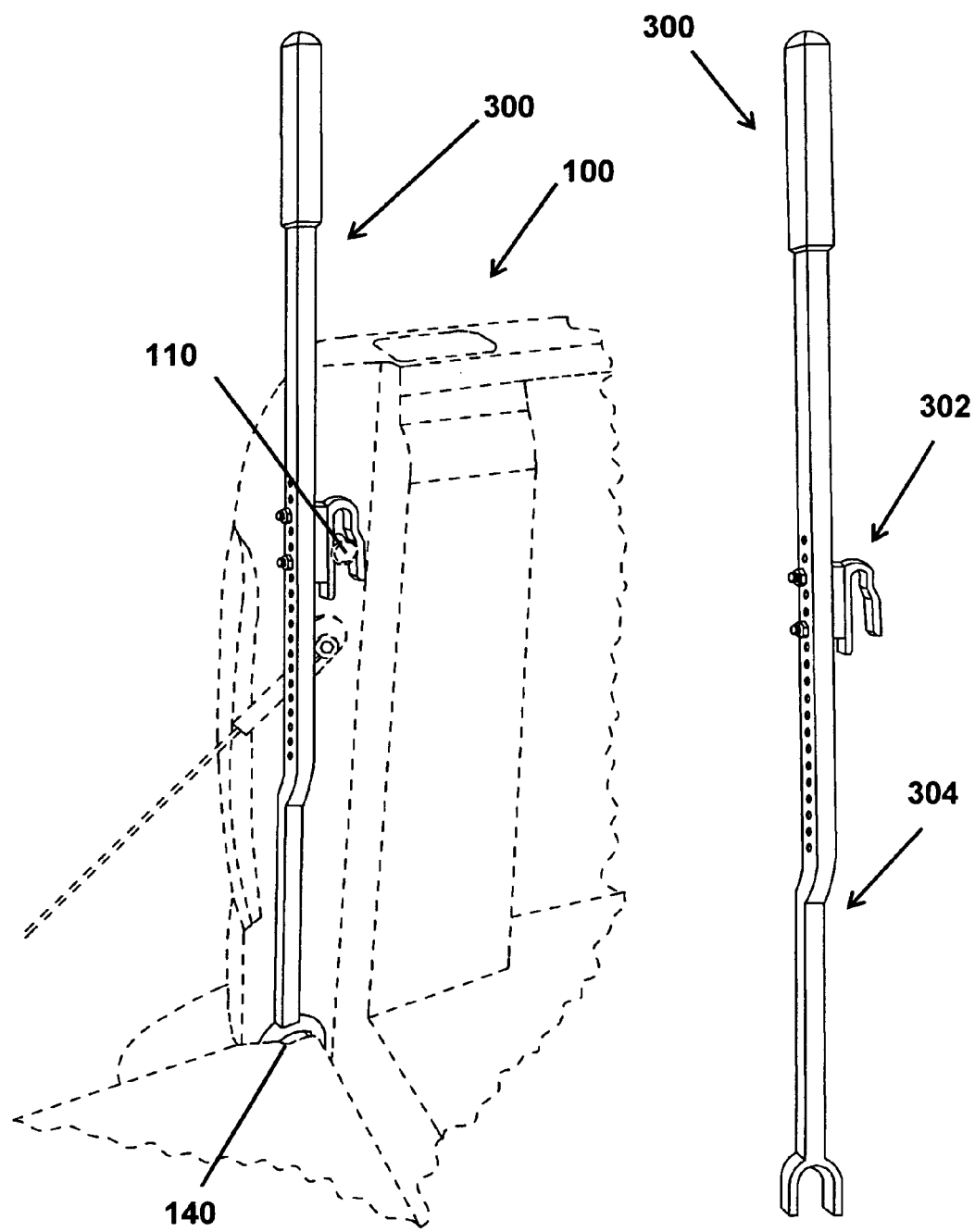
FIG. 9 is a side perspective view showing the second embodiment of the truck bed assist handle attached to a Ford pickup truck.
FIG. 10 is a side perspective view showing the second embodiment of the truck bed assist handle.

Referring to FIG. 9 through FIG. 13, a second embodiment of the present invention is shown. The second embodiment, according to the present invention, is a truck bed assist handle 300. The truck bed assist handle 300 includes a tailgate striker connector assembly 302 and an elongated body 304, as shown in FIG. 10. One side of the body 304 is shown in FIG. 11 while an adjacent side of the body 304 is shown in FIG. 12. The body 304 includes a hollow or solid shaft 306 with a tailgate hinge connector 308 affixed to the lower end of the shaft 306; a hand grip section or portion 310 and a hand grip cushion 312 located on the upper end of the shaft 306, as in the first embodiment. Between the hinge connector 308 and the hand grip section 310, are a plurality of holes 314 passing through the shaft 306.

Figure 13:
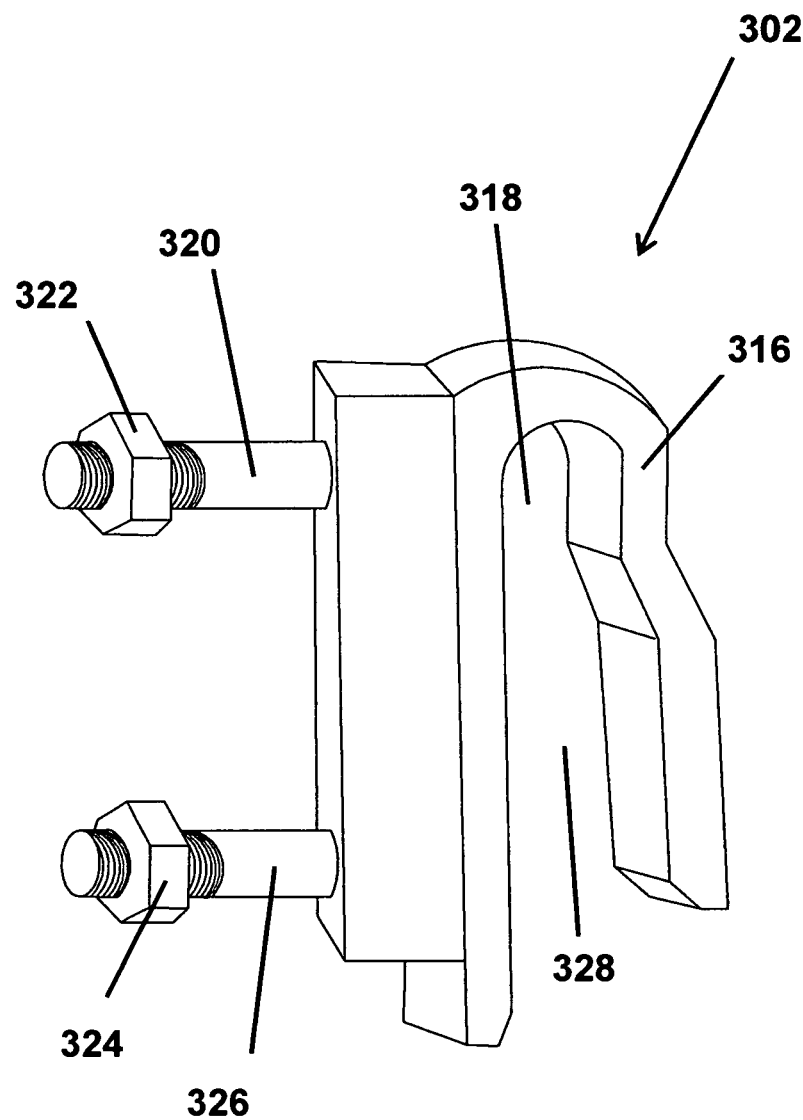
FIG. 13 is a side perspective view showing the connector assembly of the second embodiment of the truck bed assist handle.

The connector assembly 302, as shown in FIG. 10 and FIG. 13 includes a tailgate striker connector 316, attach bolts 320 and 326 affixed to the connector 316 and nut/washer combinations 322 and 324. The connector 316 has slots 318 and 328 of different sizes to accommodate the varying sizes of tailgate strikers on various trucks. The slots 318 and 328 form the general shape of a hook in connector 316. The connector assembly 302 is attached to the body 304 by inserting the bolts 320 and 326 into the appropriate holes 314 in the body 304 and then attaching the washers and threading the nuts of the nut/washer combinations 322 and 324 on the bolts 320 and 326. The appropriate holes 314 are determined by adjusting the truck bed assist handle 300 as described in the operation of the first embodiment.

In a like manner to the first embodiment, tailgate hinge connector 308 and tailgate striker connector assembly 302 can be designed to have a portion only on the forward or aft sides of the tailgate hinges 140 and 170 and/or tailgate strikers 110. In addition, the tailgate hinge connector 308 can be configured to articulate with articulation being controlled by a hand control located adjacent to the hand grip section 310 for easy grabbing and subsequent retrieval of objects from the truck bed.

Operation of the Second Embodiment—FIG. 1, FIG. 2, FIG. 9 and FIG. 10

The operation of the second embodiment is similar to that of the first embodiment. The truck bed assist handle 300 has to first be adjusted to the truck bed 100 or 150, as appropriate. Adjust the truck bed assist handle 300 by placing the bolts 320 and 326 of the tailgate striker assembly 302 in the holes 314 of the body 304 such that the body 304 is properly orientated to the left or right side of the truck bed 100 or 150, as appropriate, and the tailgate hinge connector 308 is properly engaged with the tailgate hinge 140 or 170, as appropriate, and the slot 318 or 328, as appropriate, is engaged with the tailgate striker 110 or 160, as appropriate. The washers and nuts of the nut/washer combinations 322 and 324 are then attached to the bolts 320 and 326 and the nuts fully tightened.

After adjusting the truck bed assist handle 300 to the truck bed 100 or 150, the user then installs the truck bed assist handle 300 on the truck bed 100 or 150, as shown in FIG. 9 and then can easily step into the truck bed 100 or 150, as appropriate, in the same manner as in the operation of the first embodiment.

Third Embodiment—FIG. 14 Through FIG. 17

Referring to FIG. 14 through FIG. 17, a third embodiment of the present invention is shown. The third embodiment according to the present invention is a truck bed assist handle 400. The handle 400 includes an elongated tubular member body 402 with a tailgate hinge connector 404 affixed to its lower end and a hand grip section or portion 410 located on its upper end. In between the hand grip section 410 and the tailgate hinge connector 404 are a plurality of tailgate striker engagement holes or tailgate striker connectors 408 positioned on opposite walls of the body 402. The center axis of the holes 408 on one wall of the body 402 are offset from the center axis of the holes 408 positioned on the opposite wall of the body 402. The diameter of the holes 408 is such that the tailgate striker 110 can be inserted into the holes 408. The hand grip section 410 can have a hand grip cushion similar to the hand grip cushions 212 and 312.

In a like manner to the first embodiment, tailgate hinge connector 404 and tailgate striker connectors 408 can be configured to have a portion only on the forward or aft sides of the tailgate hinges 140 and 170 and/or tailgate strikers 110. In addition, the tailgate hinge connector 404 can be configured to articulate with articulation being controlled by a hand control located adjacent to the hand grip section 410 for easy gripping and subsequent retrieval of objects from the truck bed.

Operation of the Third Embodiment—FIG. 14 and FIG. 15

The third embodiment does not require adjustment to the truck prior to use, as with the first and second embodiments. The user engages the tailgate hinge connector 404 with the tailgate hinge 140 and then inserts the tailgate striker 110 into the closest tailgate striker engagement hole 408 by slightly lifting the truck bed assist handle 400 upward until the tailgate striker 110 can be inserted. If the handle 400 has to be lifted too high for the tailgate striker 110 to be inserted into a hole 408, such that the tailgate hinge connector 404 disengages with the tailgate hinge 140, then the truck bed assist handle 400 is rotated 180 degrees so that the tailgate striker 110 can be inserted into the appropriate hole 408 on the opposite side of the body 402. After rotation, the tailgate hinge connector 404 is reengaged with the tailgate hinge 140 and the tailgate striker is then be inserted into the appropriate hole 408 leaving the tailgate hinge connector 404 engaged with the tailgate hinge 140. This is the reason for the center axis of the holes 408 on opposite walls of the body 402 being offset. FIG. 15 shows the offset of the holes 408.

After the user installs the truck bed assist handle 400 on the truck bed 100, as shown in FIG. 14 and FIG. 15, the truck user can easily step into the truck bed 100 in the same manner as in the operation of the first, second and third embodiments.

Figure 20:
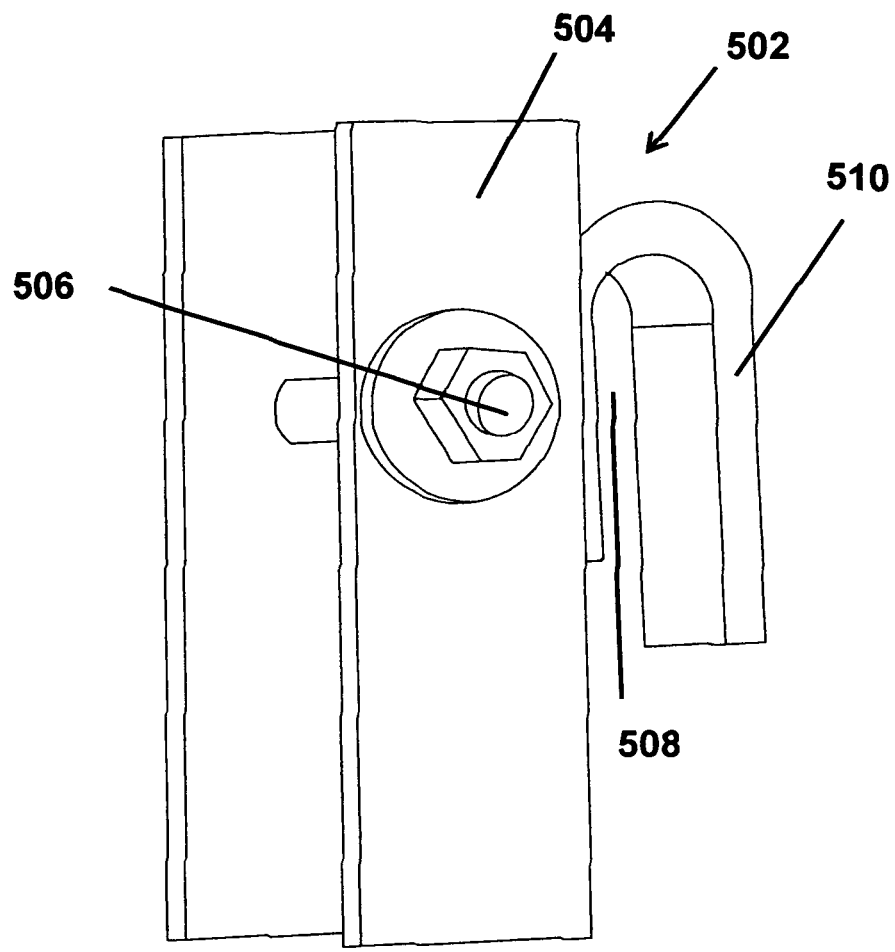
FIG. 20 is a close-up side perspective view showing the connector assembly adapter of the fourth embodiment of the truck bed assist handle.

Fourth Embodiment—FIG. 18, FIG. 19 and FIG. 20

Referring to FIG. 18, FIG. 19 and FIG. 20, a fourth embodiment of the present invention is shown. The fourth embodiment according to the present invention is a truck bed assist handle 500. The truck bed assist handle 500 includes the truck bed assist handle 400 of the third embodiment and a tailgate striker connector assembly 502. Since the third embodiment cannot be used on Toyota pickup truck beds with tailgate strikers 160, the fourth embodiment adapts the third embodiment for use on Toyota pickup trucks.

The tailgate striker assembly 502 includes a tailgate striker connector 510, affixed to a channel 504 and a nut/washer/bolt combination 506. The connector 510 includes a slot 508 to connect or engage with tailgate striker 160. The slot 508 can have at least 2 different sizes as in connectors 214 and 316. The slot 508 forms the general shape of a hook in connector 510.

Operation of the Fourth Embodiment—FIG. 18 and FIG. 19

The operation of the fourth embodiment is similar to that of the first embodiment. The truck bed assist handle 500 has to first be adjusted to the truck bed 150. The tailgate striker assembly 502 is attached to the truck bed assist handle 400 with the bolt of nut/washer/bolt combination 506 passing through both sides of the connector 504 and through applicable holes 408 of the handle 400 such that the tailgate hinge connector 404 engages with the tailgate hinge 170 and the slot 508 of the connector 510 engages with the tailgate striker 160.

After the user installs the truck bed assist handle 500 on the truck bed 150, the truck user can easily step into the truck bed 150 in the same manner as in the operation of the first embodiment.

Fifth Embodiment—FIG. 21 Through FIG. 24

Referring to FIG. 21 through FIG. 24, a fifth embodiment of the present invention is shown. The fifth embodiment, according to the present invention, is a truck bed assist handle 600. The truck bed assist handle 600 includes a tailgate striker connector assembly 602 and an elongated body 604. The body 604 includes a hollow or solid shaft 606 with a tailgate hinge connector 608 affixed to the lower end of the shaft 606 and a hand grip section or portion 610. The body 604 can have a hand grip cushion, similar to the hand grip cushions 212 and 312, located on the hand grip section 610, as in the first and second embodiments.

The tailgate striker connector assembly 602 includes a tailgate striker connector 618 affixed to a tubular member 612. The connector 618 has a slot 616 for engaging with the tailgate striker 110 or 160. The slot 616 can have at least 2 different sizes as in connectors 214 and 316. The slot 616 forms the general shape of a hook in connector 618.

The connector assembly 602 is slidingly connected to the body 604 by inserting the body 604 inside the opening 614.

In a like manner to the first embodiment, tailgate hinge connector 608 and tailgate striker connector assembly 602 can be configured to have a portion only on the forward or aft sides of the tailgate hinges 140 and 170 and/or tailgate strikers 110. In addition, the tailgate hinge connector 608 can be configured to articulate with articulation being controlled by a hand control located adjacent to the hand grip section 610 for easy grabbing and subsequent retrieval of objects from the truck bed.

Figure 21:
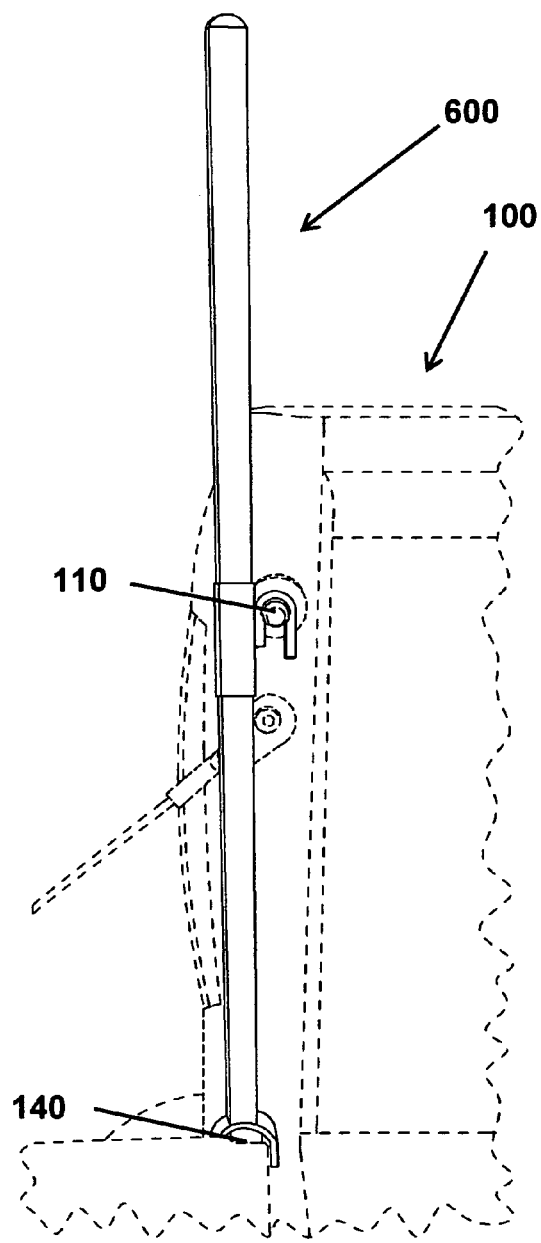
FIG. 21 is a side perspective view showing a fourth embodiment of the truck bed assist handle attached to a Ford pickup truck.
Figure 22:
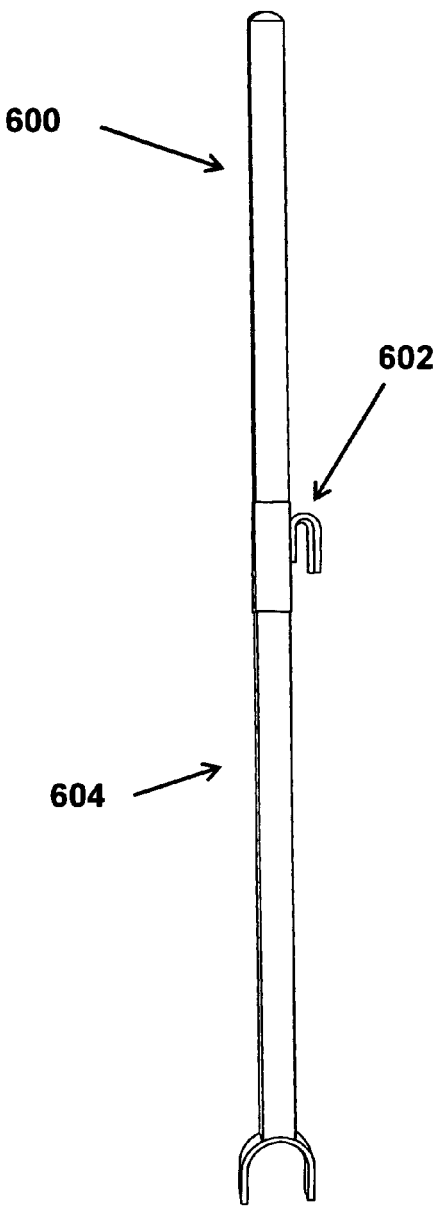
FIG. 22 is a side perspective view showing the fourth embodiment of the truck bed assist handle.

Operation of the Fifth Embodiment—FIG. 21 and FIG. 22

The fifth embodiment does not require adjustment to the truck bed prior to use, as with the first, second and fourth embodiments. The tailgate hinge connector 608 is first engaged with the tailgate hinge 140 or 170, as appropriate. The tailgate striker assembly 602 is then slid down the body 604 until the tailgate striker connector 618 is engaged with the tailgate striker 110 or 160, as appropriate.

After the user installs the truck bed assist handle 600 on the truck bed 100 or 150, as appropriate, the user can easily step into the truck bed 100 or 150 in the same manner as in the operation of the first, second third and fourth embodiments.

Sixth Embodiment—FIG. 1 Through FIG. 24

Also disclosed herein is a method for providing quick and easy entrance into a truck bed having a tailgate hinge and a tailgate striker, the method includes the steps of (1) providing a truck bed assist handle selected from the group including handles 200, 300, 400, 500 and 600; (2) engaging the applicable tailgate hinge connector 208, 308, 404 or 608 to the truck tailgate hinge; (3) engaging the applicable tailgate striker connector 214, 316, 408, 510 or 618 to the truck tailgate striker; (4) gripping the applicable handle grip section 210, 310, 410 or 610; and (5) stepping into the truck bed while using the bumper or other adjacent structure as a step. Note that steps (2) and (3) can be reversed in order of accomplishment depending on the assist handle 200, 300, 400 and 500 design.

Operation of the Sixth Embodiment

The operation of the sixth embodiment is explained in the DETAILED DESCRIPTION OF THE EMBODIMENTS— Sixth Embodiment, above.

ADVANTAGES OF THE EMBODIMENTS

From the descriptions above, a number of possible advantages of my truck bed assist handle and method therefor become evident:

(a) The assist handle provides for quick and easy entrance to a pickup bed with the tailgate in the down position;
(b) The assist handle is portable;
(c) The assist handle is quickly attached and removed without tools;
(d) The assist handle fits all recent models of standard pickups;
(e) With the assist handle, both arms can be used to assist the leg in lifting the user's body into the bed;
(f) With the use of both arms during stepping, safety is enhanced;
(g) The assist handle is simple in design and therefore, inexpensive;
(h) The assist handle can be used on both the right and left hand sides of the truck bed;
(i) The assist handle provides for quick entrance to the truck bed;
(j) The assist handle is reliable due to its simple design; and
(k) The assist handle method provides for fast and convenient entrance to the truck bed.

CONCLUSION, RAMIFICATIONS, AND SCOPE

Thus, a person of ordinary skill in the art will understand that the truck bed assist handle and method therefor is novel, simple, user friendly, inexpensive, as well as reliable and has many advantages, features, and benefits over the prior art. Furthermore, it will be readily apparent to one skilled in the art that the truck bed assist handle and method therefor of this invention provides many benefits and features that are essential for a fast, safe and easy entrance to a truck bed. Moreover, the simple design and unique portability the assist handle offers is a significant benefit to truck users over the prior art.

Although the description above contains many specificities, these should not be construed as limiting the scope of the invention but as merely providing illustrations of some of the presently preferred embodiments of this invention. Many other ramifications, variations, alterations, substitutions, modifications, and the like are readily possible within the teachings of the invention. For example, sizes, shapes, materials, assembly, design, etc. of all parts can be readily modified or changed; the shafts 206, 306 and 606 can have any cross sectional configuration; the elongated tubular member body 402 can have any cross sectional configuration; the tailgate striker connectors 214, 316, 510 and 618 can be of various shapes; the slots 220, 222, 318, 328, 508 and 616 can be of any shape such as an infinitely variable "V" shape or can be holes instead of slots; the tailgate striker connectors 510 and 618 can have double width slots as with the tailgate striker connectors 214 and 316; tailgate striker connector assemblies 202 and 602 can have two tailgate striker connectors 214 and 618, respectively each on an opposite side from each other so that the connector assemblies 202 and 602 do not have to be adjusted for the right and left hand sides of the truck beds; rather than having the tailgate striker connector assemblies 202, 302, 502 and 602 moveable with respect to bodies 204, 304, 402 and 604, the tailgate striker connector assemblies 202, 302, 502 and 602 can be permanently affixed to the bodies 204, 304, 402 and 604 and have the bodies 204, 304, 402 and 604 telescope so that the distance between the tailgate striker connectors 214, 316, 510 and 618 and the tailgate hinge connectors 208, 308, 404 and 608, respectively can be adjusted to the truck beds 100 or 150; in a like manner, the body 402 can telescope and therefore, only one tailgate striker engagement hole or tailgate striker connector 408 is required; the tailgate striker engagement holes or tailgate striker connectors 408 can be configured as holes of any configuration, such as slots either straight or tapered; the tailgate hinge connectors 208, 308, 404 and 608 can be covered with a cushion material to protect the tailgate hinges 140 and 170; the tailgate hinge connectors 208, 308, 404 and 608 can be of any configuration that provides connection to the tailgate hinges 140 and 170; the tailgate hinge connectors 208, 308, 404 and 608 do not have to be curved around both sides of the tailgate hinges 110 and 170, as previously shown, but only be capable of contacting the hinges 110 and 170 on their forward or aft side; the tailgate hinge connectors 208, 308, 404 and 608, as configured, can be replaced with the lower end of shafts 206, 306 and 606 and body 402 formed into a configuration that provides for effective tailgate hinge connection; the hand grip cushions 212 and 312 can be further elongated to provide a gripping surface for both hands; the handles 200, 300, 400, 500 and 600 can be used or configured for use on any truck having a tailgate striker and a tailgate hinge and not only just on pickup trucks; The hand grip sections 210, 310, 410 and 610 can be curved, possibly up to a full 180 degree curve, rather than straight, as shown; the bodies 204, 304, 402 and 604 can be configured to telescope and/or hinge for folding; the bodies 204, 304, 402, and 604 can be simply positioned forward of the tailgate striker 110 and aft of the tailgate hinge 140 with the elimination of the tailgate striker assemblies 202, 302, 502 and 602 and tailgate hinge connectors 208, 308, 404 and 608; and in the case of the tailgate striker 160, the bodies 204, 304, 402 and 604 can be simply positioned within the tailgate striker 160 and aft of the tailgate hinge 170 with the elimination of both the tailgate striker assemblies 202, 302, 502 and 602 and the tailgate hinge connectors 208, 308, 404 and 608

It should be understood that the design of tailgate strikers and tailgate hinges can change over time and differ from that of tailgate strikers 110 and 160 and tailgate hinges 140 and 170. Therefore, it should be understood that the scope of this invention covers communication or connection to these updated designs.

Thus, the scope of the invention should be determined not by the embodiments illustrated or examples given, but by the appended claims and their legal equivalents.

I claim:

1. A truck bed assist handle for use on a truck having a tailgate hinge, a tailgate striker and a bed, the tailgate striker having a forward facing surface with respect to the front of the truck and the tailgate hinge having a rearward facing surface with respect to the front of the truck, the assist handle comprising:
  a body,
    said body having a first end portion, a second end portion and a substantially elongated shaft disposed at least in part thereinbetween and supporting said first end portion and said second end portion,
    said first end portion having a tailgate hinge connector,
      said tailgate hinge connector having at least one engaging member, wherein one of said at least one engaging member is constructed and arranged to removably engage with at least the rearward facing surface of the tailgate hinge thereby, providing for removable engagement of said body with the tailgate hinge,
    said second end portion being configured as a hand grip,
    said body having one of at least one first tailgate striker connector and at least one second tailgate striker connector,
      said at least one first tailgate striker connector having a first aperture therein on at least one longitudinal side of said shaft, said first aperture constructed and arranged to receive and removably engage with at least the forward facing surface of the tailgate striker,
      said at least one second tailgate striker connector having a structure attached outwardly thereto said shaft, said structure having a portion thereof constructed and arranged to receive and removably engage with at least the forward facing surface of the tailgate striker,
      said at least one first tailgate striker connector and said at least one second tailgate striker connector thereby, providing for removable engagement of said body with the tailgate striker,
  whereby, a truck user can attach the assist handle to the truck's tailgate striker and tailgate hinge, with the tailgate in the open position, and then by both gripping and using said second end portion for lifting and stability assistance, the user can easily access the truck's bed.

2. The handle as defined in claim 1 wherein said portion of said structure is configured as a second aperture, and wherein said second aperture has one of a closed internal edge and a partially open edge.

3. The handle as defined in claim 1 wherein said at least one second tailgate striker connector is defined as two second tailgate striker connectors and wherein said two second tailgate striker connectors are disposed on opposite sides of said shaft from each other.

4. The handle as defined in claim 1 wherein said at least one second tailgate striker connector is adjustable along said shaft, for changing the distance thereinbetween said structure and said first end portion.

5. The handle as defined in claim 1 wherein an additional aperture having a partially open edge is included thereinbetween said shaft and said portion of said structure to receive and removably engage with the tailgate striker.

6. The handle as defined in claim 1 wherein said at least one first tailgate striker connector is defined as a plurality of tailgate striker connectors in said shaft.

7. The handle as defined in claim 1 wherein the distance thereinbetween said first end portion and said second end portion is adjustable.

8. The handle as defined in claim 7 wherein the adjustment of said distance is accomplished by at least one of telescoping and hinging said body.

9. The handle as defined in claim 1 wherein said at least one engaging member of said tailgate hinge connector is defined as two engaging members and wherein said two engaging members have a spacing sufficient for receiving the tailgate hinge thereinbetween said two engaging members.

10. The handle as defined in claim 1 wherein said at least one engaging member having articulation for grasping and subsequent retrieval of articles from the truck bed.

11. A method for easy entrance into a bed of a truck having a tailgate hinge, a tailgate striker and a bed, the tailgate striker having a forward facing surface with respect to the front of the truck and the tailgate hinge having a rearward facing surface with respect to the front of the truck, the method comprising the steps of:
  (a) providing a truck bed assist handle comprising:

a body,
   said body having a first end portion, a second end portion and a substantially elongated shaft disposed at least in part thereinbetween and supporting said first end portion and said second end portion,
   said first end portion having a tailgate hinge connector,
      said tailgate hinge connector having at least one engaging member, wherein one of said at least one engaging member is constructed and arranged to removably engage with at least the rearward facing surface of the tailgate hinge thereby, providing for removable engagement of said body with the tailgate hinge,
   said second end portion being configured as a hand grip,
   said body having one of at least one first tailgate striker connector and at least one second tailgate striker connector,
      said at least one first tailgate striker connector having a first aperture therein on at least one longitudinal side of said shaft, said first aperture constructed and arranged to receive and removably engage with at least the forward facing surface of the tailgate striker,
      said at least one second tailgate striker connector having a structure attached outwardly thereto said shaft, said structure having a portion thereof constructed and arranged to receive and removably engage with at least the forward facing surface of the tailgate striker,
      said at least one first tailgate striker connector and said at least one second tailgate striker connector thereby, providing for removable engagement of said body with the tailgate striker,
(b) engaging said tailgate hinge connector with the tailgate hinge and one of said first tailgate striker connector and said second tailgate striker connector with the tailgate striker;
(c) gripping said second end portion; and
(d) accessing the truck bed while using said second end portion for lifting and stability assistance.

12. The method as defined in claim 11 wherein said at least one second tailgate striker connector is defined as two second tailgate striker connectors and wherein said two second tailgate striker connectors are disposed on opposite sides of said shaft from each other.

13. The method as defined in claim 11 wherein said portion of said structure is configured as a second aperture, and wherein said second aperture has one of a closed internal edge and a partially open edge.

14. The method as defined in claim 11 wherein said at least one second tailgate striker connector is adjustable along said shaft for changing the distance thereinbetween said structure and said first end portion.

15. The method as defined in claim 11 wherein an additional aperture having a partially open edge is included thereinbetween said shaft and said portion of said structure to receive and removably engage with the tailgate striker.

16. The method as defined in claim 11 wherein the distance thereinbetween said first end portion and said second end portion is adjustable.

17. The method as defined in claim 11 wherein said at least one engaging member of said tailgate hinge connector is defined as two engaging members and wherein said two engaging members have a spacing sufficient for receiving the tailgate hinge thereinbetween said two engaging members.

18. A truck bed assist handle for use on a truck having a tailgate hinge, a tailgate striker and a bed, the assist handle comprising:
   a body,
      said body having a first end portion, a second end portion and a substantially elongated shaft disposed at least in part thereinbetween and supporting said first end portion and said second end portion,
      said first end portion having a tailgate hinge connector,
         said tailgate hinge connector having two engaging members, wherein said two engaging members have a spacing sufficient for both receiving the tailgate hinge thereinbetween said two engaging members, and removal therefrom said tailgate hinge, thereby, providing for removable engagement of said body with the tailgate hinge,
      said second end portion configured as a hand grip,
      said body having one of at least one first tailgate striker connector and at least one second tailgate striker connector,
         said at least one first tailgate striker connector having a hole therein on at least one longitudinal side of said shaft,
         said at least one second tailgate striker connector having a structure attached outwardly thereto said shaft, said structure including a hook, at least in part,
            said hole and said hook each being constructed and arranged to both receive and removably engage with the tailgate striker, at least in part, thereby, providing for removable engagement of said body with the tailgate striker,
   whereby, a truck user can attach the assist handle to the truck's tailgate striker and tailgate hinge, with the tailgate in the open position, and then by both gripping and using said second end portion for lifting and stability assistance, the user can easily access the truck's bed.

19. The handle as defined in claim 18 wherein said at least one second tailgate striker connector is adjustable along said shaft, for changing the distance thereinbetween said structure and said first end portion.

20. The handle as defined in claim 18 wherein said at least one second tailgate striker connector is defined as two second tailgate striker connectors and wherein said two second tailgate striker connectors are disposed on opposite sides of said shaft from each other.

* * * * *